(12) United States Patent
Stegelmann et al.

(10) Patent No.: US 7,260,569 B1
(45) Date of Patent: Aug. 21, 2007

(54) EVALUATING EXPRESSIONS IN STORED PROCEDURES

(75) Inventors: Rolf Günter Erich Stegelmann, Valencia, CA (US); Jeetendra Chaware, Andhra Pradesh (IN)

(73) Assignee: NCR Corporation, Dayton, OH (US)

( * ) Notice: Subject to any disclaimer, the term of this patent is extended or adjusted under 35 U.S.C. 154(b) by 66 days.

(21) Appl. No.: 10/081,079

(22) Filed: Feb. 21, 2002

(51) Int. Cl.
 *G06F 17/30* (2006.01)
 *G06F 7/00* (2006.01)
(52) U.S. Cl. .............................. 707/4; 707/10
(58) Field of Classification Search ............... 707/1–5, 707/104.1
 See application file for complete search history.

(56) References Cited

U.S. PATENT DOCUMENTS

| | | | |
|---|---|---|---|
| 5,675,804 A * | 10/1997 | Sidik et al. ................ | 717/139 |
| 5,794,231 A * | 8/1998 | Li et al. ..................... | 707/2 |
| 5,875,334 A * | 2/1999 | Chow et al. ................ | 717/141 |
| 5,930,795 A | 7/1999 | Chen et al. ................. | 707/100 |
| 5,948,063 A | 9/1999 | Cooper et al. ............. | 709/223 |
| 6,202,070 B1 | 3/2001 | Nguyen et al. ............ | 707/104.1 |
| 6,327,629 B1 * | 12/2001 | Wang et al. ............... | 719/313 |
| 6,340,977 B1 | 1/2002 | Lui et al. ................... | 705/709 |
| 6,477,540 B1 * | 11/2002 | Singh et al. ............... | 707/103 R |
| 6,507,834 B1 * | 1/2003 | Kabra et al. ............... | 707/2 |
| 6,604,096 B1 | 8/2003 | Couch et al. ............... | 707/2 |
| 6,732,084 B1 * | 5/2004 | Kabra et al. ............... | 707/2 |
| 6,741,997 B1 * | 5/2004 | Liu et al. ................... | 707/102 |
| 7,010,784 B1 * | 3/2006 | Sentovich et al. ......... | 717/140 |

OTHER PUBLICATIONS

PR Newswire "Oracle Delivers Superior Performance and Scalability with Latest Release of Oracle9i Application Server", Jun. 5, 2001.*
Naude, F. and V. Harshvardhan "Oracle9i Release 1 New Features/Upgrade FAQ", downloaded from www.orafaq.com, Aug. 14, 2001.*
Vijay, S. "PL/SQL Native Compilation and Performance", downloaded from www.dbaoncall.net, Dec. 20, 2001.*
Oracle "PL/SQL User's Guide and Reference, Release 9.0.1", Chapter 12 Tuning PL/SQL Applications, downloaded from download-ease.oracle.com, 2001.*
Pribyl, B. and S. Feuerstein "Learning Oracle PL/SQL", Sebastopol:O'Reilly & Associates, Inc., 2002, pp. 1-19, 329-330, ISBN: 0-596-00180-0.*
Feuerstein, S. and B. Pribyl "Oracle PL/SQL Programming", Sebastopol:O'Reilly & Associates, Inc., 2002, pp. 3-21, 718-721, 761-762. ISBN: 0-596-00381-1.*
Lamba, R. "PL/SQL Native Compilation", Technical Paper, TATA Consultancy Services, Oct. 2003.*

(Continued)

*Primary Examiner*—Luke S Wassum
(74) *Attorney, Agent, or Firm*—Trop, Pruner & Hu; John D. Cowart

(57) ABSTRACT

A database system includes components for executing stored procedures that include at least one of a conditional expression, assignment expression, and dynamic database query language (e.g., SQL) statement. For each such expression, a predetermined type of code is generated and inserted into the object code corresponding to the stored procedure. When executing the stored procedure object code, the predetermined type of code is evaluated directly without having to generate a separate database query language statement.

4 Claims, 3 Drawing Sheets

OTHER PUBLICATIONS

Schrag, R. "Native PL/SQL Compilation in Oracle9i", Powerpoint Presentation, downloaded from www.dbspecialists.com. undated.*

Oracle "Native Compilation of PL/SQL", downloaded form www.oracle.com, undated.*

Rosenberg, D. "Bringing Java to the Enterprise: Oracle on its Java Server Strategy", IEEE Internet Computing, vol. 2, No. 2, Mar./Apr. 1998, pp. 52-59.*

Halfhill, T.R. "How to Soup Up Java", Byte Magazine, May 1998.*

Nobody Win "Soory for 9i", Oracle-L listserv posting, Nov. 3, 2000.*

Gadhia, T. and C. Racicot "PC/SQL Enhancements Planned for Future Oracle Releases", downloaded from www.quest-pipelines.com/newsletter/Oracle_PLSQL_Enhancements.doc, Jun. 2000.*

Oracle "Natively Compiled Code", Oracle8i Java Developer's Guide, Release 3 (8.1.7).*

Llewellyn, B., S. Picciano and B. Kuder "New PL/SQL Features in Action: Real World Case Studies", Paper #32501, delivered at OracleWorld, Nov. 11, 2002.*

Quest Software "Pipeline Newsletter Archive—Oracle PL/SQL", downloaded from www.quest-pipelines.com/pipelines/plsql/news_archive.htm, Jul. 6, 2006.*

NCR "Introduction to Teradata® RDBMS", Version V2R4.0/V2R4.0.1, Publication R035-1091-060A, Sep. 2000.*

NCR "Introduction to Teradata® RDBMS", Version V2R4.1, Publication B035-1091-061A, Jun. 2001.*

See 1 in Addendum.

See 2 in Addendum.

Bryn Llewellyn; PL/SQL Enhancements in Oracle9I; Paper #129, Oracle Openworld, San Francisco, Tue Dec. 4, 2001; Oracle.

Uwe Suckow, IFB Informatik Fur Banken AG; Native Compilation Von PL/SQL in Oracle9I; Seite 54—Newsletter Apr. 2001; Tips & Techniques.

U.S. Appl. No. 10/126,403, entitled "Caching Stored Procedure Code," by Rolf Günter Erich Stegelmann and Jeetendra Chaware, filed Apr. 19, 2002.

* cited by examiner

EVALUATING EXPRESSIONS IN STORED PROCEDURES

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table, with an entity being a person, place, or thing about which the table contains information.

To extract data from, or to update, a relational table, queries according to a standard database query language (e.g., Structured Query Language or SQL) are used. Examples of SQL statements include INSERT, SELECT, UPDATE, and DELETE. There are various ways to submit SQL queries to a database system. One is for a user to sequentially type in SQL statements into a user terminal, with the statements submitted to the database system.

Another technique for accessing and manipulating data in a database system is by use of stored procedures. Stored procedures are implemented according to a stored procedure language (SPL), such as that defined by SQL-99, which defines certain structures for implementing predefined capabilities. Example structures of SPL include conditional execution structures (e.g., IF . . . THEN . . . ELSE, CASE, WHILE, FOR, LOOPING, REPEAT), block structures (e.g., sequences of SQL statements); named variables; and named procedures. Stored procedures are created with a CREATE PROCEDURE statement or a REPLACE PROCEDURE statement. To use a stored procedure, an application program or another stored procedure calls the stored procedure to invoke execution of the stored procedure.

In some conventional database systems, such as one version of the TERADATA® database system from NCR Corporation, some expressions in stored procedures are evaluated by submitting SQL statements. Examples of such expressions include conditional expressions (e.g., WHILE, IF . . . THEN, etc.) and the SET statement. For each occurrence of one of the above expressions, the SQL SELECT statement is submitted in the database system. For example, consider the following SPL source text:

DECLARE V1, V2 INTEGER;
SET V2=V1+10;

The SET statement provided above is converted into the following SQL SELECT statement during stored procedure creation:

USING (spVV0 INTEGER, spVV1 INTEGER) SELECT :spVV0+10 INTO :spVV1;

The above SQL SELECT statement is submitted each time the SET expression is evaluated during execution of the stored procedure. The same is true for conditional expressions in SPL source text, such as the following WHILE conditional expression:

WHILE (v1+v2<10) DO;

The above WHILE condition is converted into the following SQL SELECT statement:

USING (spVV0 INTEGER, spVV1 INTEGER) SELECT 1
WHERE (:spVV0+:spVV1<10)

The SQL SELECT statement above is submitted each time the WHILE conditional expression is evaluated during execution of the stored procedure.

The submission of SQL SELECT statements is associated with performance overhead in a database system. Typically, the SELECT statement has to be parsed and actions corresponding to SELECT statements are dispatched to the appropriate entities for performing access or manipulation of data. Also, messages are exchanged during creation of the SQL SELECT statements for SET and conditional expressions in stored procedures.

The increased performance overhead associated with creating and submitting SQL SELECT statements for certain types of expressions in stored procedures reduces the overall available capacity and efficiency of a database system.

SUMMARY

In general, an improved method and apparatus is provided for evaluating certain types of expressions in stored procedures. For example, a method of executing a stored procedure (having at least an expression and a database query language statement) in a database system includes generating an object code for the stored procedure, the object code containing a first type of code to represent the expression, and a second type of code to represent the database query language statement. At run-time, during execution of the stored procedure object code, the first type code is evaluated directly without separately generating a database query language statement to evaluate the expression.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
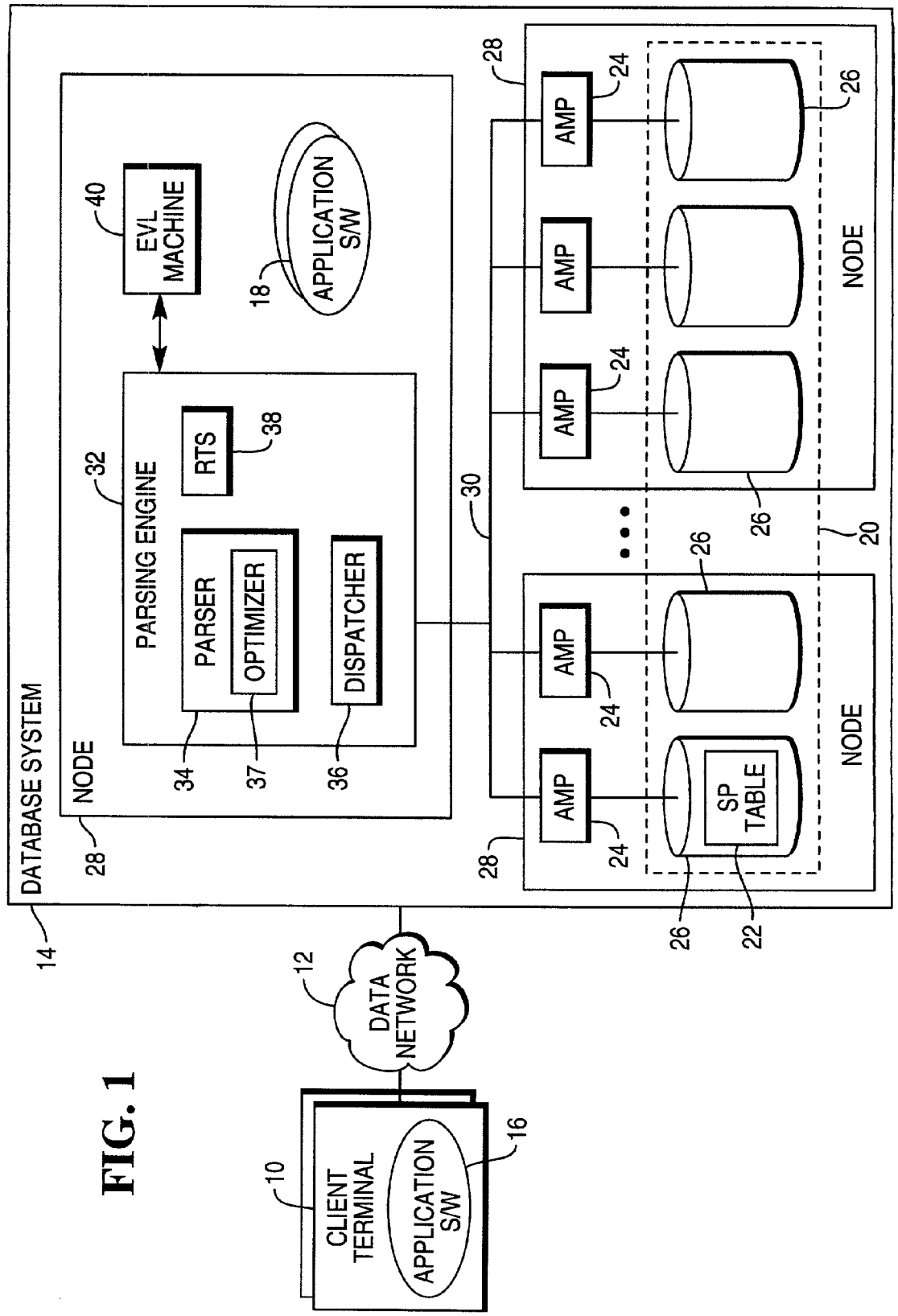
FIG. 1 is a block diagram of an example arrangement of a database system coupled to one or more client terminals over a data network.

In FIG. 1, a database system 14 is coupled over a data network 12 to one or more client terminals 10. Examples of the data network 12 include a local area network (LAN), a wide area network (WAN), the Internet, and so forth. The client terminal 10 is capable of issuing queries according to a standard database query language to the database system 14 to access or update data or to create or alter data structures (e.g., tables, rows, and so forth) in the database system 14. One example of the standard database query language is the Structured Query Language (SQL), provided by the American National Standards Institute (ANSI). One version of SQL is the SQL-92 Standard, while another version is the SQL-99 Standard. In other embodiments, other versions of SQL or other standard database query languages can be used.

Application software 16 is executable in each client terminal 10, and similarly, application software 18 is executable in the database system 14. Such application software 16 and 18 are capable of issuing SQL queries for accessing or manipulating data in the database system 14. Also, the application software 16 and 18 are also able to call stored procedures in the database system 14 to execute predefined tasks. Each stored procedure is defined according to a stored procedure language (SPL), such as that defined in SQL-99. Usually, the syntax of SPL differs from database system to system. In one example embodiment, the database system 14 is a TERADATA® database system form NCR Corporation, which provides for one type of SPL syntax for defining stored procedures. However, in other embodiments, other types of database systems can be employed that use different SPL syntax.

Stored procedures are stored as object code in a storage system 20. The object code can be stored in a stored procedure table (referred to as "SP table") 22. In one embodiment, the database system 14 is a distributed, parallel processing system, which has multiple access module processors (AMPs) 24 that are capable of concurrently managing access of data stored in respective storage modules 26. The storage modules 26 make up different portions of the storage system 20. The AMPs 24 are software modules that are executable in respective nodes 28. In the embodiment of FIG. 1, the SP table 22 can be stored on one storage module 26 or on multiple storage modules 26. More generally, AMPs are referred to as "access modules."

The AMPs 24 are coupled by an interconnect layer 30 to a parsing engine 32 that is executable on another node 28. Alternatively, the parsing engine 32 can be executable on a node in which AMPs 24 are present. Also, there can be multiple instances of the parsing engine 32 for parallel execution. The AMPs 24 respond to steps received from the parsing engine 32. Responsibilities of the AMPs 24 include locking databases, tables, and portions of tables; creating, modifying, or deleting definitions of tables; inserting, deleting, or modifying rows within tables; and retrieving information from definitions and tables. The AMPs 34 also return responses to the parsing engine 32. In the example arrangement of FIG. 1, multiple AMPs 24 are executable on each node 28.

Each parsing engine 32 includes a parser 34 and a dispatcher 36. When the parsing engine 32 receives an SQL request from a client application, such as application software 16 or 18 or another source, the parser 34 interprets the SQL statement, checks it for proper SQL syntax and evaluates it semantically. The parser 34 also includes an optimizer 37 whose role is to develop the least expensive plan to return the requested response. Several alternative query plans are evaluated and the most efficient query plan is chosen by the optimizer 37. The chosen query plan is then converted into executable "steps" that are submitted to the AMPs 24 for execution. The parser 34 passes the generated steps to the dispatcher 36, which controls the sequence in which the steps are executed. The dispatcher 36 then transmits the sequence of steps over the interconnect layer 30 to one or more AMPS 24.

The parsing engine 32 also includes a run-time subsystem 38, which includes various components (see FIG. 2) for locally evaluating predetermined types of expressions in stored procedures. The run-time subsystem 38 cooperates with an evaluator (EVL) machine 40 to efficiently execute the predetermined types of expressions.

According to one embodiment, the predetermined types of expressions include conditional expressions, assignment expressions, and dynamic database query language (e.g., SQL) statements. Examples of conditional expressions include the following: WHILE; IF . . . THEN; REPEAT; CASE; FOR; and so forth. SET is an example of an assignment expression, although there are also other types of assignment expressions. A dynamic SQL statement is a statement whose request text can vary from execution to execution. The dynamic SQL statement includes a string used for invoking execution of the dynamic SQL statement (e.g., "dbc.SysExecSQL") followed by a string expression that contains elements for building an SQL statement. The elements include string literals (containing the text of the SQL statement to build), variables, input parameters, and others. An example dynamic SQL statement (that is part of a stored procedure) is as follows:

CALL dbc.SysExecSQL ('CREATE TABLE' ∥ :my_database ∥'.'∥ :my_table ∥ :sales_columns);

The string literals 'CREATE TABLE' specify a CREATE TABLE DDL (data definition language) statement. The variables my_database, my_table, and sales_columns are dynamically set or declared within the stored procedure. Each invocation of the stored procedure may involve different values for the variables.

Conventionally, conditional expressions, assignment expressions, and dynamic database query language statements in stored procedures cause the submission of corresponding SQL statements (e.g., SELECT) during execution of the stored procedure whenever the expressions are evaluated. However, submission of SQL SELECT statements to evaluate such expressions is typically an inefficient way of executing stored procedures containing such expressions. In the context of a dynamic SQL statement, the SELECT statement is submitted to set the variables (such as the variables my_database, my_table, and sales_column in the above example) of the dynamic statement. Note that the underlying SQL statement (CREATE TABLE in the above example) of the dynamic SQL statement must still be submitted to the database system for execution.

For more efficient execution, conditional expressions, assignment expressions, and dynamic database query language statements in a stored procedure are converted to "compiled evaluation code" in stored procedure object code at compile time. In one embodiment, the compiled evaluation code is machine-level code that is in binary form. Generally, the compiled evaluation code is referred to as "low-level code," which is code that can be directly executed without the submission of a standard database query language statement.

Thus, wherever conditional expressions, assignment expressions, or dynamic statements (collectively referred to as "target expressions") are encountered in a stored procedure, corresponding compiled evaluation codes are created to represent the target expressions. In the ensuing description, compiled evaluation code is also referred to as "EVL code."

Other statements or expressions in the stored procedure are represented without generating the EVL code. At run time, the EVL code is directly evaluated locally by the EVL machine. Note that the EVL machine 40 is located on the same node as the parsing engine 32, which calls the EVL machine 40 to invoke routines for executing EVL code. The local evaluation of the target expressions improves the efficiency of executing stored procedures containing such expressions.

An example stored procedure is provided below:

```
1.  CREATE PROCEDURE pe (IN i INTEGER, INOUT k INTEGER)
2.  BEGIN
3.      WHILE (k <= i)
4.      DO
5.          IF (k = i) THEN
6.              INSERT loadl (:i);
7.          END IF
8.          SET k = k + 1;
9.      END WHILE;
10. END:
```

The stored procedure has 10 lines of expressions or statements. Conventionally, for the example provided above, a corresponding SQL SELECT statement is executed for each of the conditional expression at line 3 (IF ... THEN), the conditional expression at line 5 (WHILE), and the SET statement at line 8. The three SQL SELECT statements are submitted in addition to the SQL INSERT statement at line 6 if the condition at line 5 is true.

However, in accordance with some embodiments of the invention, instead of submitting SQL SELECT statements, EVL code for each of the expressions at lines 3, 5, and 8 is generated (at compile time) and stored in the object code corresponding to the stored procedure. At run time, the EVL code is locally evaluated directly by the EVL machine 40 during execution of the stored procedure. Therefore, in the example above, the only SQL statement that is submitted is the INSERT statement at line 6 if the condition at line 5 is evaluated to be true.

In one embodiment, the object code corresponding to the stored procedure is in C code format. However, in other embodiments, the object code is in another format. Statements other than conditional expressions, assignment expressions, and dynamic database query language statements are represented in C code format in the object code. This is contrasted with the EVL code used to represent conditional expressions, assignment expressions, and dynamic statements. The EVL code is contained in a predefined data structure, with one instance of the predefined data structure stored in the object code for each occurrence of a target expression. In one example, the predefined data structure is an array containing a sequence of bits or bytes that represent a corresponding expression.

Figure 2:
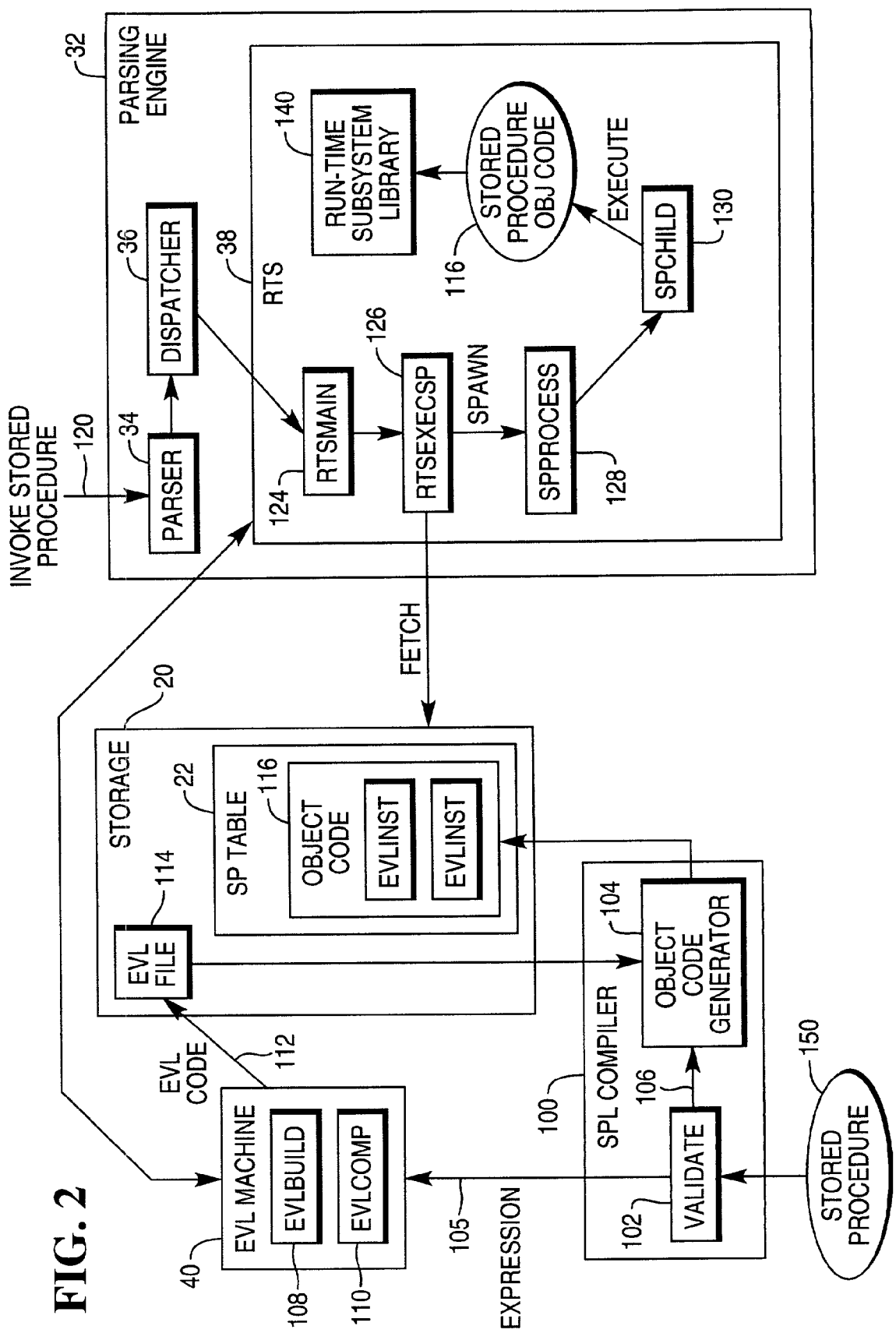
FIG. 2 is a block diagram of components of the database system of FIG. 1, in accordance with an embodiment.

FIG. 2 illustrates components of the database system 14 that are involved in creating, at compile time, the EVL code for target expressions that occur in a stored procedure. FIG. 2 also shows components involved in the execution of stored procedure object code at run time.

When a new stored procedure 150 is created (such as a procedure written by a user or downloaded from another system), it is submitted to an SPL compiler 100. The SPL compiler 100 includes a validate module 102 to validate expressions and statements in the stored procedure 150. The stored procedure 150 includes target expressions that are to be converted to EVL code as well as other statements or expressions that are not to be converted to EVL code. Each target expression is identified by the validate module 102 and submitted (at 105) to the EVL machine 40. The other statements and expressions are submitted (at 106) by the validate module 102 to an object code generator 104. In one embodiment, the object code generator 104 generates C code.

The EVL machine 40 includes an EVLBUILD module 108 and an EVLCOMP module 110. The EVLCOMP module 110 validates conditional expressions and creates the EVL code that corresponds to each conditional expression. Similarly, the EVLBUILD module 108 validates assignment expressions and dynamic database query language statements and creates the EVL code corresponding to each of such expressions. In another embodiment, instead of separate modules 108 and 110, one module is used to validate and create EVL code for all the target expressions. The EVLBUILD module 108 or EVLCOMP module 110 provides (at 112) the generated compiled EVL code for storage in an EVL file 114. The EVL file is a temporary location used during stored procedure object code creation. The file is cleaned up after stored procedure object code creation. The EVL file 114 can be stored in the storage system 20. Alternatively, instead of being stored in the storage system 20, the EVL file 114 is stored in local storage in the node 28 on which the parsing engine 32 resides.

In generating the object code that corresponds to the stored procedure 150, the object code generator 104 retrieves the EVL code from the EVL file 114. The EVL code is copied from the EVL file 114 into an array designated as EVLINST. In one embodiment, the array EVLINST is an unsigned character array. The EVLINST array includes the EVL code in addition to other information.

Figure 3:
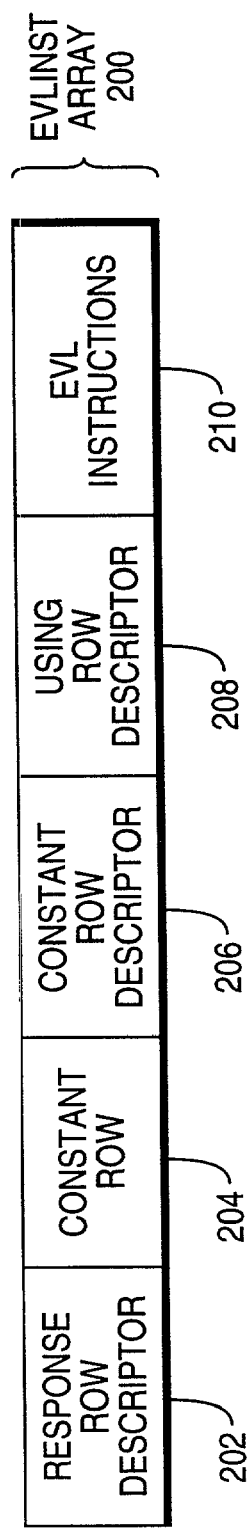
FIG. 3 illustrates a data structure of compiled evaluation code to represent certain types of expressions in stored procedures.

In one embodiment, the information contained in the EVLINST array 200 includes the information shown in FIG. 3. A response row descriptor field 202 describes the format of the response (the response row) from the EVL machine 40 after evaluating an expression corresponding to the EVL code in an EVL instructions field 210 of the array 200. A constant row field 204 contains the constant data that is referenced in an expression. The constant data is used by the EVL code in the EVL instructions field 210 for evaluating the expression. For example, in the example stored procedure shown above, the "SET k=k+1" expression has the constant data "1". This constant data is stored in the constant row field 204. A constant row descriptor field 206 describes the constant row to indicate if any constant data is referenced in an expression, and if so, how to use the constant data. In the example above, the constant row descriptor field 206 would indicate that the constant data is to be added to the variable k.

A using row descriptor field 208 in the array 200 describes each variable used in an expression. Thus, in the example above, the variable used is the variable "k". The information stored in the EVLINST array effectively identifies the type of expression and the variables and constants associated with the expression, which allows the expression to be locally evaluated by the EVL machine 40.

Depending on how many target expressions are in the stored procedure 150, a corresponding number of EVLINST arrays are added to an object code 116 generated by the object code generator 104. The object code 116 is stored in the stored procedure table 22.

In one embodiment, the following data structure is also defined to enable the EVL machine 40 to find the information in the EVL file 114 to insert into the response row descriptor field 202, constant row field 204, constant row descriptor field 206, using row descriptor field 208, and EVL instructions field 210 of the array 200. In one embodiment, this data structure is referred to as the trnEvlInfoType structure, which contains the following fields: OffSetOfExprInEvlFile (which contains the offset of the EVL code within the EVL file 114); LenOfRespRowDesc (which contains the length of the response row descriptor); LenOfConstRow (which contains the length of the constant row); LenOfConstRowDesc (which contains the length of the constant row descriptor); LenOtUsingRowDesc (which contains the length of the using row descriptor); LenOfEvlInsts (which contains the length of the EVL code): and TotalSize (which indicates the total size of the information corresponding to a target expression within the EVL file 114).

Once the object code 116 is stored in the SP table 22, it is available for retrieval by the run-time subsystem 38 during execution of a stored procedure. As illustrated, invocation of a stored procedure is received (at 120) by the parser 34 in the parsing engine 32. The parser 34 passes the invocation of the stored procedure to the dispatcher 36, which then makes an SQL CALL request (at 122) to invoke routines in the run-time subsystem 38. In one example, the SQL CALL request at 122 is made to a well-known mailbox, which is a predefined mailbox for making an SQL CALL request for invoking execution of a stored procedure.

In response to the SQL CALL request, an RTSMain module 124 sends a message to another module, an RTSExecSP module 126. The RTSMain module 124 is responsible for handling calls from the dispatcher 36, as well as responses from an executed stored procedure. The RTSExecSP module 126 is responsible for fetching the object code corresponding to the invoked stored procedure from the SP table 22 in the storage system 20. The RTSExecSP module 126 also initiates an SPProcess module 128, which in turn initiates stored procedure execution by creating a child process SPChild module 130. The SPChild module 130 executes the stored procedure object code 116. The arrangement of the run-time subsystem 32 shown in FIG. 2 is provided as an example only, as other embodiments will have other arrangements. In such other arrangements, the modules 124, 126, 128, and 130 can be combined into fewer modules or separated into more modules.

To handle any EVL code contained in the stored procedure object code 116, a call is made to one or more routines in a run-time system library 140. The routines in the run-time system library 140 invoke either the EVLBUILD module 108 or the EVLCOMP module 110 in the EVL machine 40 to evaluate the EVL code associated with the conditional expression, assignment expression or dynamic statement in the executed stored procedure. Note that the EVLINST array representing each occurrence of a target expression contains information pertaining to constant data and variables used in the expressions. Therefore, the EVL code can be executed locally by the EVL machine 40 without the need to involve any of the AMPs 24 of the database system that would result if an SQL SELECT is submitted to evaluate the target expression.

Figure 4:
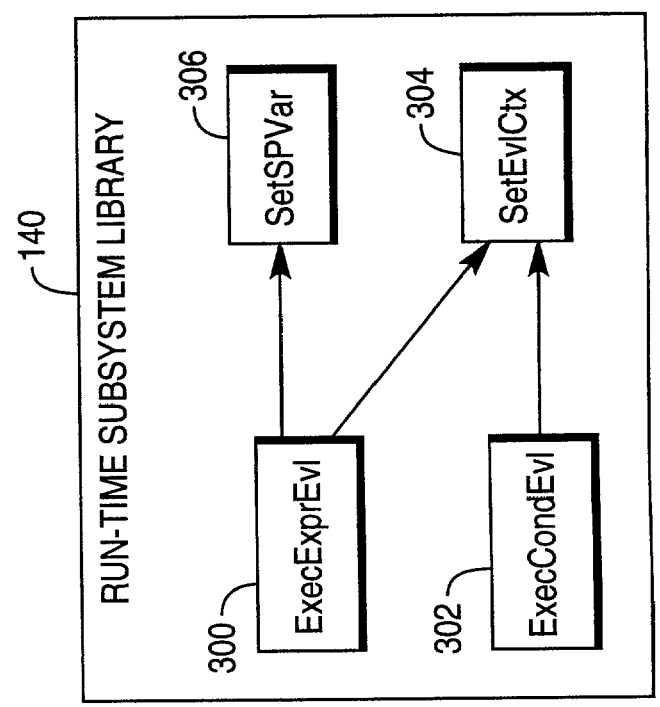
FIG. 4 is block diagram of a run-time subsystem library in the database system of FIG. 1.

As shown in FIG. 4 the run-time system library 140 contains the following modules: ExecExprEvl module 300 (to evaluate an assignment expression or a dynamic database query language statement); an ExecCondEvl module 302 (for evaluating conditional expressions in the stored procedure object code); RtsLSetEvlCtx module 304 (called by either the ExecExprEvl module 300 or the ExecCondEvl module 202 to establish the context corresponding to the conditional expression, assignment expression, or dynamic statement); and a SetSPVar module 306 (called by the ExecExprEvl module 300 to set a variable on the left hand side of a SET statement). The SetEvlCtx module 300 reads the EVL code, the constant row descriptor, the constant row, the using row descriptor, and the response row descriptor fields in the EVLINST array 200. The SetEvlCtx module 204 also builds a Using row corresponding to the variables that are used in the expression. The SetEvlCtx module 204 also initializes the EVL context with the appropriate information, including setting the constant row and using row information.

The ExecExprEvl module 300 invokes the EVLBUILD module 108 in the EVL machine 40 to execute the EVL code associated with an assignment expression or a dynamic statement. Similarly, the ExecCondEvl module 302 invokes the EVLCOMP module 110 in the EVL machine 40 to execute the EVL code associated with a conditional expression in the stored procedure object code. In an alternative embodiment, the evaluation of the different types of expressions can be performed by one module instead of separate modules.

In executing the object code for a stored procedure having EVL code for a conditional expression, operation proceeds as follows. The EVL code is evaluated locally by the EVL machine 40 to determine if the condition is true (taking into account the current value of any variables and constants). If the local evaluation of the EVL code returns a TRUE result, then the statement subject to the condition is executed. This local evaluation of the EVL code to evaluate a conditional expression provides substantial efficiency improvements over systems in which a SELECT statement has to be submitted form the parsing engine 32 to one or more AMPs 24 to evaluate the conditional expression. The same is true of local evaluation of EVL codes for assignment expressions and dynamic database query language statements.

Instructions of the various software routines or modules discussed herein (such as the run-time subsystem 38, parser 34, dispatcher 36, EVL machine 40, SPL compiler 100, AMPs 24, and others) are loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A database system comprising:
    a plurality of nodes;
    an evaluator module in a first one of the plurality of nodes;
    an access module in a second one of the plurality of nodes, the access module to manage access to a portion of data stored in the database system; and
    a controller in the first node adapted to execute a stored procedure object code, the object code containing a first type of code to represent an expression that is one of a conditional expression, an assignment expression, and a dynamic statement, the object code containing a second, different type of code to represent a database query language statement,
    the controller adapted to submit the first type of code to the evaluator module to evaluate the expression, and
    the controller adapted to submit a command corresponding to the database query language statement to the access module.

2. The database system of claim 1, wherein the controller comprises a parsing engine.

3. The database system of claim 1, wherein the first type code comprises machine-level code.

4. The database system of claim 1, wherein the first type code contains information identifying a type of the expression and a variable and constant used by the expression.

* * * * *